(12) United States Patent
Kim et al.

(10) Patent No.: US 6,868,444 B1
(45) Date of Patent: Mar. 15, 2005

(54) SERVER CONFIGURATION MANAGEMENT AND TRACKING

(75) Inventors: Steven D. Kim, Aguora Hills, CA (US); Lior Elazary, Agoura Hills, CA (US)

(73) Assignee: Interland, Inc., Boise, ID (US)

( * ) Notice: Subject to any disclaimer, the term of this patent is extended or adjusted under 35 U.S.C. 154(b) by 713 days.

(21) Appl. No.: 09/678,170

(22) Filed: Oct. 2, 2000

Related U.S. Application Data

(63) Continuation-in-part of application No. 09/565,520, filed on May 5, 2000, now abandoned.

(51) Int. Cl.[7] ............................................. G06F 13/00
(52) U.S. Cl. ...................................... 709/223; 709/220
(58) Field of Search ............................... 709/200, 201, 709/203, 217, 218, 219, 220, 221, 222, 223, 224

(56) References Cited

U.S. PATENT DOCUMENTS

| | | | |
|---|---|---|---|
| 5,857,102 A | * | 1/1999 | McChesney et al. |
| 6,098,098 A | * | 8/2000 | Sandahl et al. |
| 6,308,205 B1 | * | 10/2001 | Carcerano et al. |
| 6,374,295 B2 | * | 4/2002 | Farrow et al. |
| 6,389,464 B1 | * | 5/2002 | Krishnamurthy et al. |
| 6,496,858 B1 | | 12/2002 | Frailong et al. ............ 709/221 |
| 6,560,639 B1 | | 5/2003 | Dan et al. ................... 709/218 |
| 6,564,216 B2 | * | 5/2003 | Waters |
| 6,567,849 B2 | * | 5/2003 | Ludovici et al. |
| 6,654,891 B1 | * | 11/2003 | Borsato et al. |

\* cited by examiner

*Primary Examiner*—Moustafa M. Meky
(74) *Attorney, Agent, or Firm*—Thomas, Kayden, Horstemeyer & Risley LLP

(57) ABSTRACT

A web hosting system comprises a plurality of geographically separate web hosting facilities with a plurality of servers located at each of the facilities having internet resources hosted thereon. A network accessible centralized database remote from at least some of the web hosting facilities contains information comprising one or more of server serial number, server model, server facility location, server location within a facility, server speed, server memory capacity, server traffic, and server software configuration for at least some of the servers. In some embodiments, different users are allowed to access different information in the database.

26 Claims, 11 Drawing Sheets

Site Administration

Domain Name: testsg20.com  [Search]

Domain Name: testsgl20.com
Username: testsgl2
Password: test1234  [update]
Server: sgl20 (Virtual Host : Unix Standard)     36
IP Address: 207.190.100.4
Date Created: 2/4/00  7:52:25 AM
Space: 100  [update]
Max POP: 5  [update]
Max Aliases: 5  [update]
Frontpage: Yes ▼
TrellixWeb:
Anon. FTP: Yes ▼  [update]
SSL: Yes ▼  [update]
MySQL: Yes ▼  [update]
MSQL: Yes ▼  [update]
Servlets: Yes ▼  [update]
Cybercash: Yes ▼  [update]
PaymentNet: Yes ▼  [update]
ShopPlus: Yes ▼  [update]
Reseller: www.hostpro.net ▼  [update]
Email:                           [resend]
Real Media  Streams: [ ]  Space: [ ] MB  [update]
Net Show: Bandwidth [ ]  Clients: [ ]  [update]

[SUSPEND SITE]

FIG. 3

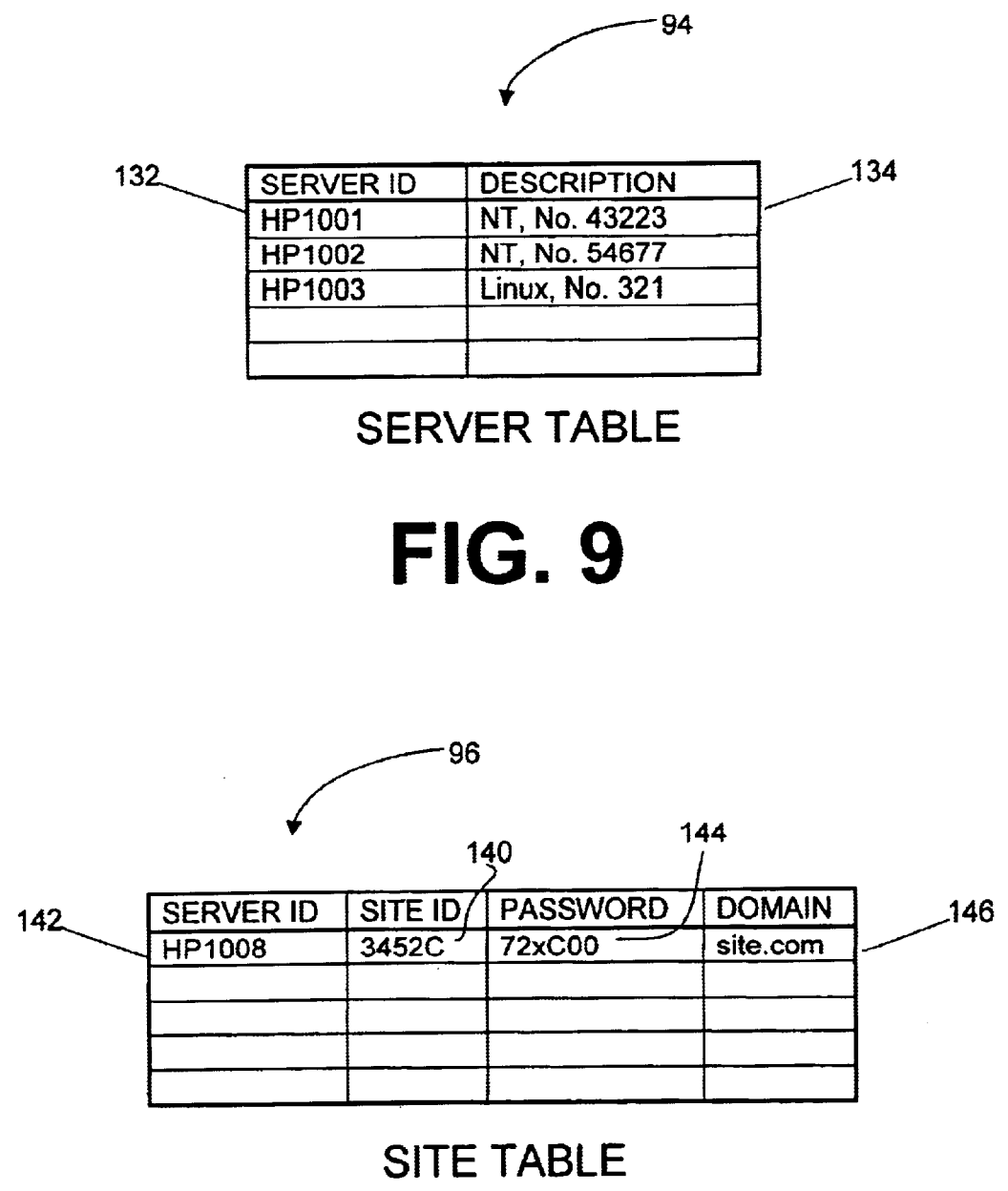

SERVER TABLE

| SERVER ID | DESCRIPTION |
|---|---|
| HP1001 | NT, No. 43223 |
| HP1002 | NT, No. 54677 |
| HP1003 | Linux, No. 321 |
| | |
| | |

FIG. 9

SITE TABLE

| SERVER ID | SITE ID | PASSWORD | DOMAIN |
|---|---|---|---|
| HP1008 | 3452C | 72xC00 | site.com |
| | | | |
| | | | |
| | | | |
| | | | |

FIG. 10

| SERVER ID | SITE ID | SPACE | STREAMS |
|---|---|---|---|
| HP1008 | 7568A | 100 MB | 20 |
| HP1004 | 2234A | 50 MB | 10 |
|  |  |  |  |
|  |  |  |  |
|  |  |  |  |

MEDIA SERVER TABLE

FIG. 11

| SERVER ID | SITE ID | SPACE | IP | MEMORY | CPU |
|---|---|---|---|---|---|
| HP1004 | 9067C | 100 MB |  |  | 20 |
| HP1002 | 4356A | 10 MB |  |  | 10 |
|  |  |  |  |  |  |
|  |  |  |  |  |  |
|  |  |  |  |  |  |

WEB SERVER TABLE

FIG. 12

SERVER CONFIGURATION MANAGEMENT AND TRACKING

CROSS REFERENCE TO RELATED APPLICATIONS

This application claims priority to and is a continuation-in-part of U.S. patent application Ser. No. 09/565,520, filed on May 5, 2000, now abandoned, and entitled System and Method for Managing Server Configurations. The entire disclosure of this application is hereby incorporated by reference in its entirety.

BACKGROUND

1. Field

The invention relates to computer networks. In particular, the invention relates to managing and documenting network server configuration.

2. Description of Related Art

Explosive growth of the Internet, and in particular e-commerce, has resulted in a dramatic increase in the rate at which companies and individuals are creating network resources such as World-Wide-Web sites, email accounts, and the like. Most companies do not have a direct connection to the Internet and thus contract with a web hosting company, or internet service provider (ISP), to provide access to the Internet and to host the resources they wish to make available to other Internet users.

Typically a web hosting service provider may provide a wide range of e-commerce, application hosting, and connectivity services. For example, a company or individual may contract with a web hosting company to provide a specified amount of memory on a server for the company to establish and maintain its web site. In addition, the company may contract for other types of services, such as, for example, email services, secure socket layer (SSL), file transfer protocol (FTP) service, database services, and real media service allowing streaming audio and video from the company's web site. To provide these services, the ISP operates a plurality of servers. In most cases, a single server has enough memory capacity and processing power to serve as a host system for the needs of several customers. In some cases, however, a single customer may have their own dedicated server, which is effectively leased or rented from the ISP, and which hosts services that are provided only to that customer.

After a company or individual has established its initial set of services with a web hosting service provider, they may wish to change the services it has contracted for. In addition, customers that maintain one or more dedicated servers may wish to have their server hardware modified or upgraded. For example, if the company had not originally contracted for real media service, it may wish to add this feature to its web site. Typically, when a company wants to change the services it has contracted for, a request for the desired change would be communicated to the web hosting service provider. At the web hosting service provider, a system administrator would determine if the new services are available to the requesting company and which network servers of the web host's system should be configured to accommodate the requested configuration. The system administrator would then access the appropriate server and change the server configuration to conform to the requested change. In some instances, accessing the appropriate server may require the system administrator to travel to a remote site where a server is located. At some facilities, this process was partially automated by programming the servers with scripts that performed some tasks of the configuration process. However, administrator access to the server was still required to implement the configuration changes.

In addition, web hosting service providers must maintain accurate records of the server hardware and software configurations. The records of the server configurations allow the web hosting, service provider to monitor equipment utilization to help determine, for example, when increased customer demand would justify upgrading existing equipment, or bringing additional equipment on line. Accurate records are also required to ensure proper billing of companies contracting for the services provided. To both maintain server configurations according to customer desires, and to simultaneously track server configurations as they are altered over time, a system administrator would both update server configurations and also update a database containing information regarding server configurations. Requiring the system administrator to update a database is prone to errors in entry, as well as inadvertently failing to record a configuration change that was made. In addition, ISP customers have not had easy access to information concerning server configuration so as to ensure it is currently meeting their requirements.

Therefore, there is a need in the art for methods and apparatus to improve the speed and efficiency of matching server configurations with customer desires. In addition, there is a need in the art for methods and apparatus to improve the recording and monitoring of network equipment configuration.

SUMMARY

A web hosting system comprises a plurality of geographically separate web hosting facilities with a plurality of servers located at each of the facilities having internet resources hosted thereon. A network accessible centralized database remote from at least some of the web hosting facilities contains information comprising one or more of server serial number, server model, server facility location, server location within a facility, server speed, server memory capacity, server traffic, and server software configuration for at least some of the servers. In some embodiments, different users are allowed to access different information in the database.

In another embodiment, a computer implemented method of managing the configuration of a plurality of geographically separated servers used to host internet resources comprises storing information related to the configuration of substantially all of the servers in a database, routing a predefined subset of the information to a user in a server information web page. In response to the routing, receiving from a user a request for a configuration change of at least one of the servers. In response to the request, the remote server configuration is modified.

In yet another embodiment, an information processing system comprises a first database storing server hardware inventory information regarding a plurality of servers, and a second database storing server application program parameter information regarding the plurality of servers.

BRIEF DESCRIPTION OF THE DRAWINGS

FIG. 3 is a screen display allowing updates to a configuration parameter database.

FIG. 9 is an illustration of a server table of FIG. 5.

FIG. 10 is an illustration of the site table of FIG. 5.

FIG. 11 is an illustration of a first application program table of FIG. 5.

FIG. 12 is an illustration of a second application program table of FIG. 5.

FIG. 14 is a screen display showing server hardware configuration.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
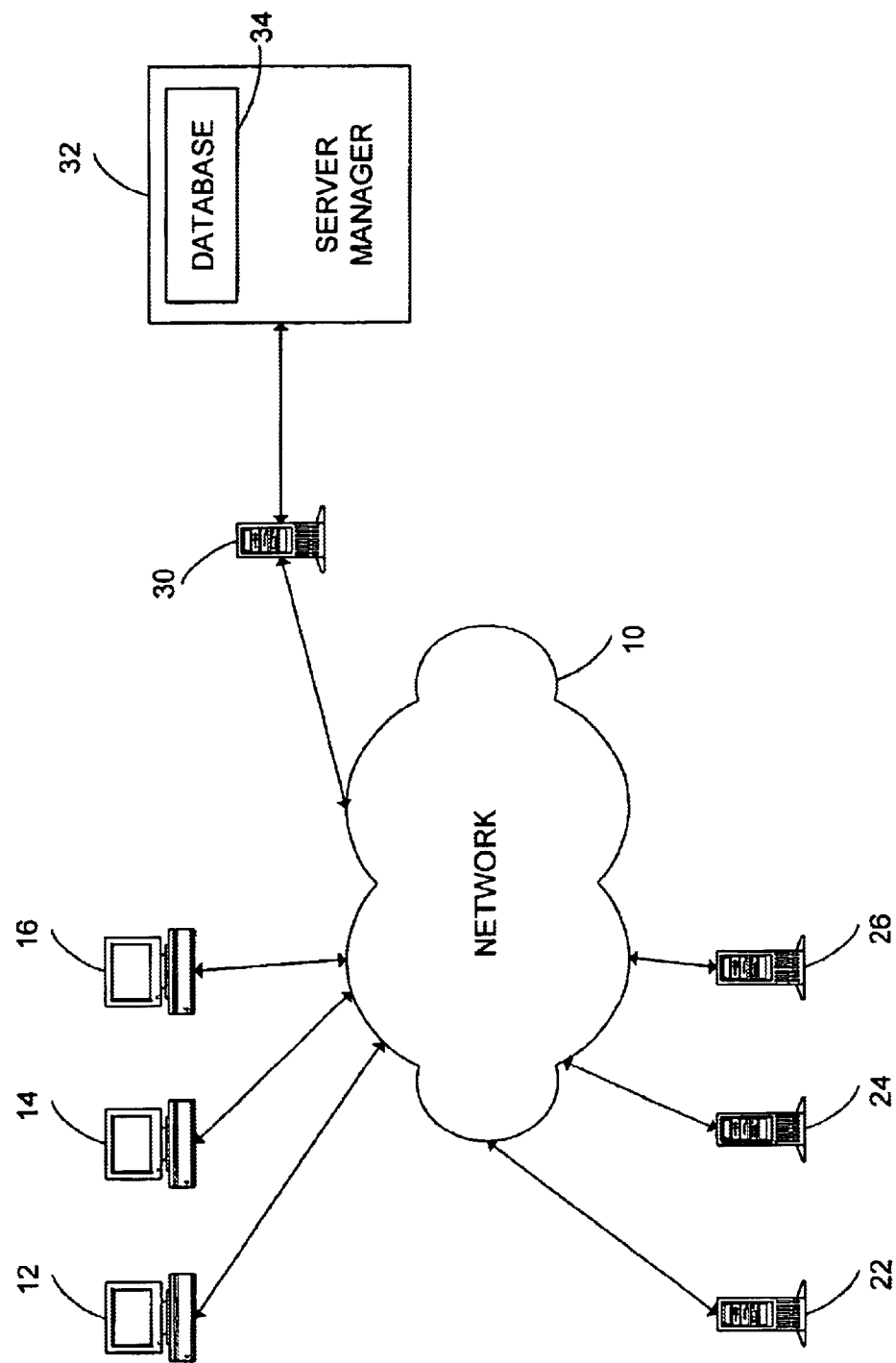
FIG. 1 as a diagram of a computer network in one embodiment of the invention.

FIG. 1 shows an exemplary computer network 10 connecting one or more computing machines. The network 10 may be any type of electronically connected group of computers including, for instance, the following networks: Internet, Intranet, Local Area Networks (LAN), Wide Area Networks (WAN) or an interconnected combination of these network types. In addition, the connectivity within the network 10 may be, for example, remote modem, Ethernet (IEEE 802.3), Token Ring (IEEE 802.5), Fiber Distributed Datalink Interface (FDDI), Asynchronous Transfer Mode (ATM), or any other communication protocol. Computing devices linked to the network may be desktop, server, portable, hand-held, set-top box, personal digital assistant (PDA), a terminal, or any other desired type or configuration. Depending on their functionality, the network connected devices may vary widely in processing power, internal memory, and other performance aspects. Communications within the network and to or from the computing devices connected to the network may be either wired or wireless. Wireless communication is especially advantageous for network connected portable or hand-held devices. The network 10 may include, at least in part, the world-wide public Internet which generally connects a plurality of users in accordance with a client-server model in accordance with the transmission control protocol/internet protocol (TCP/IP) specification. A client-server network is a dominant model for communicating between two computers. Using this relationship, a client computer (the "client") issues one or more commands to a server computer (the "server"). The server fulfills client commands by accessing available network resources and returning information to the client pursuant to client commands. During this process, client computer systems and network resources resident on the network servers are assigned a network address for identification during communications between elements of the network. Communications from other network connected systems to the servers will include the network address of the relevant server/network resource as part of the communication so that the appropriate destination of the data/request is identified as the recipient. When the network 10 comprises the global Internet, the network address is an IP address in the TCP/IP format which may, at least in part, route data to an e-mail account, a web-site, or other Internet tool resident on the server. In this way, information and services which are resident on the network servers may be available to the web browser of a client computer through a domain name (e.g. www.site.com) which maps to the IP address of the network server.

As shown in FIG. 1, a plurality of clients 12, 14, and 16 are connected to the network 10 via respective communication links. Typically, each of these clients may access the network 10 via any desired form of communication, such as via a dial-up modem connection, cable link, a digital subscriber line (DSL), wireless or satellite link, or any other form of communication. Each client may communicate using any machine that is compatible with the network 10, such as a personal computer (PC), work station, dedicated terminal, personal data assistant (PDA), or other similar equipment. The clients 12, 14, and 16 may or may not be located in the same geographical area.

As shown in FIG. 1, a plurality of servers 22, 24, and 26 are connected to the network 10 to serve clients that are in communication with the network 10. Each server is typically a powerful computer or device that manages network resources and responds to client commands. As is known in the art, the servers include computer readable data storage media such as hard disk drives and RAM memory that store program instructions and data. Using such stored programs, the servers 22, 24, 26 run application programs that respond to client commands. As shown in FIG. 1, for example, the server 22 may run a web server application for responding to client requests for HTML pages. It may also run a mail server application for receiving and routing electronic mail. Other application programs, such as an FTP server or a media server for streaming audio/video data to clients may also be running on the server 22. In some cases, different servers may be dedicated to performing different tasks. For example, the server 22 may be a dedicated web server that manages resources relating to web sites for various users, whereas the server 24 may be dedicated to provide electronic mail (email) management. Other servers may be dedicated for media (audio, video, etc.), file transfer protocol (FTP), or a combination of any two or more services that are typically available or provided over a network. Each server may be in a location that is the same as or different from that of other servers. In many cases, a web hosting service provider will maintain sets of servers at dispersed geographic locations. Moreover, there may be multiple servers that perform mirrored tasks for users, thereby relieving congestion or minimizing traffic directed to and from a single server. In one embodiment of the invention, the servers 22, 24, 26 are under the control of a web hosting provider in the business of maintaining and delivering third party content over the network 10.

Web hosting providers deliver services to two different types of clients. One type, referred to herein as a "browser", requests content from the servers 22, 24, 26 such as web pages, email messages, video clips, etc. A second type of client, referred to herein as a "user", hires the web hosting provider to maintain a network resource such as a web site, and to make it available to browsers. Users contract with the web hosting provider to make memory space, processor capacity, and communication bandwidth available for their desired network resource, generally paying the web hosting provider in accordance with the amount of server resources the user desires to utilize.

Due to the potentially large number of geographically separated servers which must be managed in order to provide these services, a server inventory tracking utility 27 is advantageously provided. In one embodiment, the web hosting service provider implements an intranet which internally links the hosting servers 22, 24, 26 as well as other servers and/or client computers operated by the web hosting service provider. In the illustration of FIG. 1, the intranet may form a portion of the network 10. One of the intranet servers 28 runs the inventory tracker utility 27, and is coupled to a database 29. As will be explained in additional detail below, the database 29 advantageously stores information about the hardware and software configuration and the activity of at least some of the hosting servers 22, 24, 26. This information may include, for example, server serial number, server model, server facility location, server location within a facility, server speed, server memory capacity, server traffic, and server software configuration. Preferably, the database provides a centralized repository of information about substantially all of the hosting servers operated by the web hosting service provider, regardless of geographic location. It can thus be appreciated that the server 28 and the database 29 may itself be located in a different geographic location form at least some of the hosting servers 22, 24, 26. As will be explained more fully below with reference to FIG. 14, selected portions of the information in the database 29 may be made available to users in addition to employees/managers of the web hosting service provider.

Furthermore, application programs which manage the network resources hosted by the servers must be properly configured. The program configuration process generally involves defining a set of parameters which control, at least in part, the application program's response to browser requests and which also define, at least in part, the server resources available to a particular user. In conventional web hosting environments, only network administrators associated with the web hosting company that owned the servers 22, 24, 26 were allowed access to the application program parameters to change application program operation so as to modify, for example, the amount of storage space allocated to a given user's web site. This helped insure tight control of the web hosting service provider over application program configuration. However, all user requests for new server resources or a reconfiguration of their existing resources required human intervention, which is slow and relatively expensive.

Figure 2:
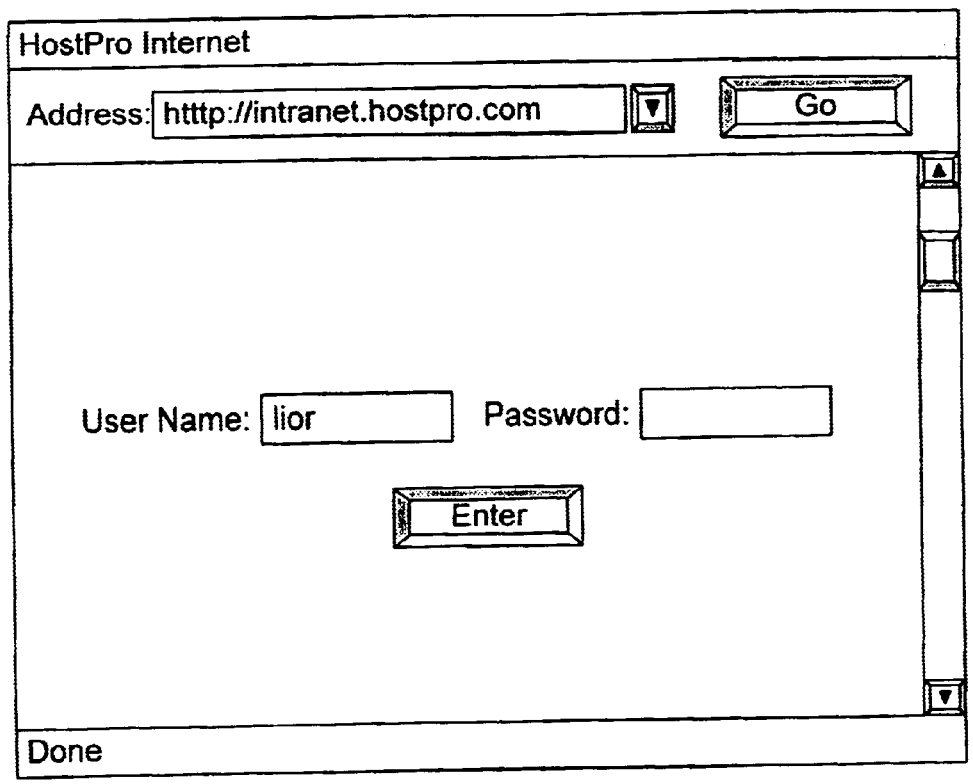
FIG. 2 is a screen display of a login screen for modifying configuration parameters.

In one embodiment of the invention, however, the user is provided access to application program parameters in a manner which still ensures adequate control over program configuration by the web hosting service provider. In one embodiment, an intranet server 30 is in communication with the network 10 via a communication link. It will be appreciated that this intranet server 30 may be the same as or different from the intranet server 28 that is coupled to the inventory database. The intranet server 30 is in communication with a server manager 32. The server manager 32 comprises a database of the application program configuration parameters which are being utilized in the servers 22, 24, 26. In this embodiment, users modify the database 34 via the intranet 30, and the server manager 32 interacts with the servers 22, 24, 26 to modify application program parameters so that they match the content of the database. In a typical operation, a user logs onto the intranet server 30 by connecting to the intranet 30 via computer 12 and entering authentication information, such as a username and password. An example screen display for entering this information is provided in FIG. 2.

In some advantageous embodiments, when the user wishes to sign up for new service or modify an existing service, the intranet server 30 authenticates the user (via the screen display of FIG. 2 for example) and provides the user with a interactive screen display/control panel that allows the user to access configuration parameters for a particular application program. One example of such an interactive screen display is illustrated in FIG. 3. In this embodiment, the user is presented with a number of modifiable text boxes that describe aspects of the configuration of the user's web site or other network resource.

For example, if a user desires to increase memory space reserved on a server for its web site, the user is provided with a "memory space" field 36 (FIG. 3) in which the user specifies the desired memory space. In response to receiving this information, the intranet server 30 updates the database 34. The server manager 32 forwards this information to the appropriate server, and the new parameter is used during application program operation. Thus, the intranet server 30 is configured to provide users with access to configuration parameters of hosted network resources (e.g., web pages, email, FTP sites, media sites, etc.), for which a user has contracted with the web hosting service provider.

As will be described in additional detail below, the configuration parameters may be stored in the database 34 in the format of a plurality of tables. When the user modifies the desired configuration parameter (e.g., memory space) for its web site, the intranet server 30 communicates such modification along with user identification information to the server manager 32. In turn, the server manager 32 updates one or more tables that include this parameter. Once the one or more tables are updated in the server manager 32, the server manager 32 communicates one or more commands to one or more of the servers 22, 24, and 26 indicating that the one or more tables of the server manager 32 has been modified. In one embodiment, the servers are configured to run a dedicated program (e.g., a daemon) that is triggered to retrieve the modified parameter from the updated table of the server manager 32. As is known in the art, a daemon commonly refers to a process that runs in the background and performs a specified operation at predefined times or in response to certain events. After being triggered by the server manager 32, the daemon updates the configuration of the application program (e.g., web server) with the retrieved parameter. One embodiment of this process is described in further detail in the description of the processes of FIGS. 4–6. Generally, the intranet server 30, server manager 32, and network servers 22, 24, 26 are all under the management and control of the web hosting service provider. In some embodiments, these computers will be located in a single facility and connected to a common local area network. In other embodiments, these computers are widely separated geographically and may communicate over the public Internet. The computers 12, 14, 16, utilized by the users to access the intranet 30 will generally be geographically remote from the server manager 32 and the servers 22, 24, 26, although it will be appreciated that one or more of these devices 12, 14, 16 may be directly connected to the intranet 30 or other LAN which includes the server manager 32.

Figure 4:
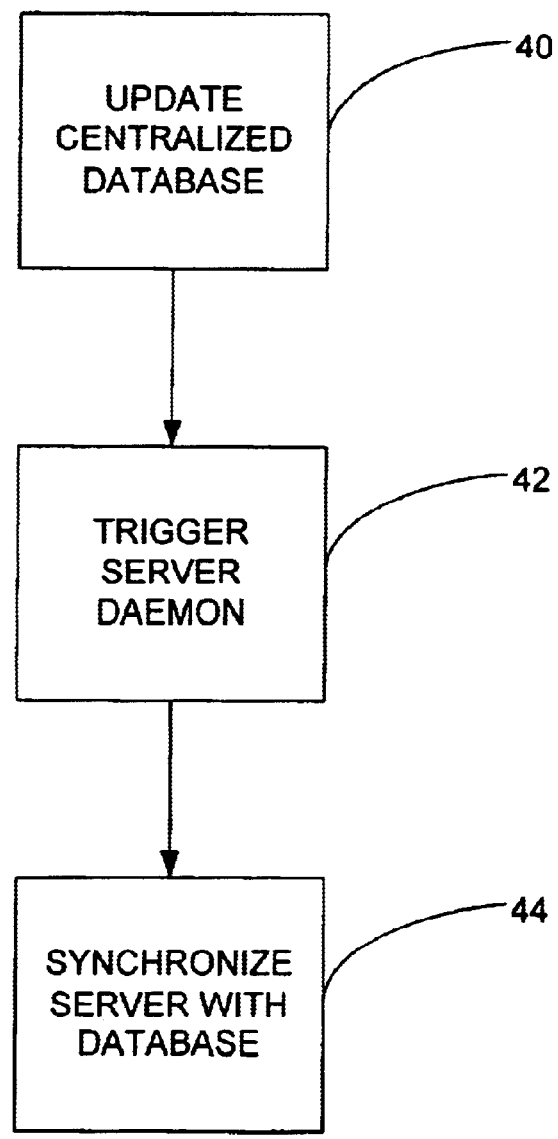
FIG. 4 is a flow chart of an automated server configuration process in one embodiment of the invention.

FIG. 4 is a flowchart of a method of updating a server configuration. The process begins in block 40, where a centralized database is updated with selected parameters to make the desired change to the configuration of a selected application program. This modification to the database may be made by a user, as described above, or by a network administrator associated with the web hosting service provider. After the centralized database has been updated, flow continues to block 42. In block 42, a program residing on a selected server, commonly referred to as a daemon, is initiated or triggered. When the daemon program is triggered, it will read the modified fields in the updated centralized database. Flow then continues to block 44. In block 44, the daemon, using the parameters from the modified fields of the centralized database, will update or synchronize the server configuration with the updated centralized database fields accordingly. In this way, a database of server configurations is kept consistent with the actual server configurations automatically and with little or no human intervention.

Figure 5:
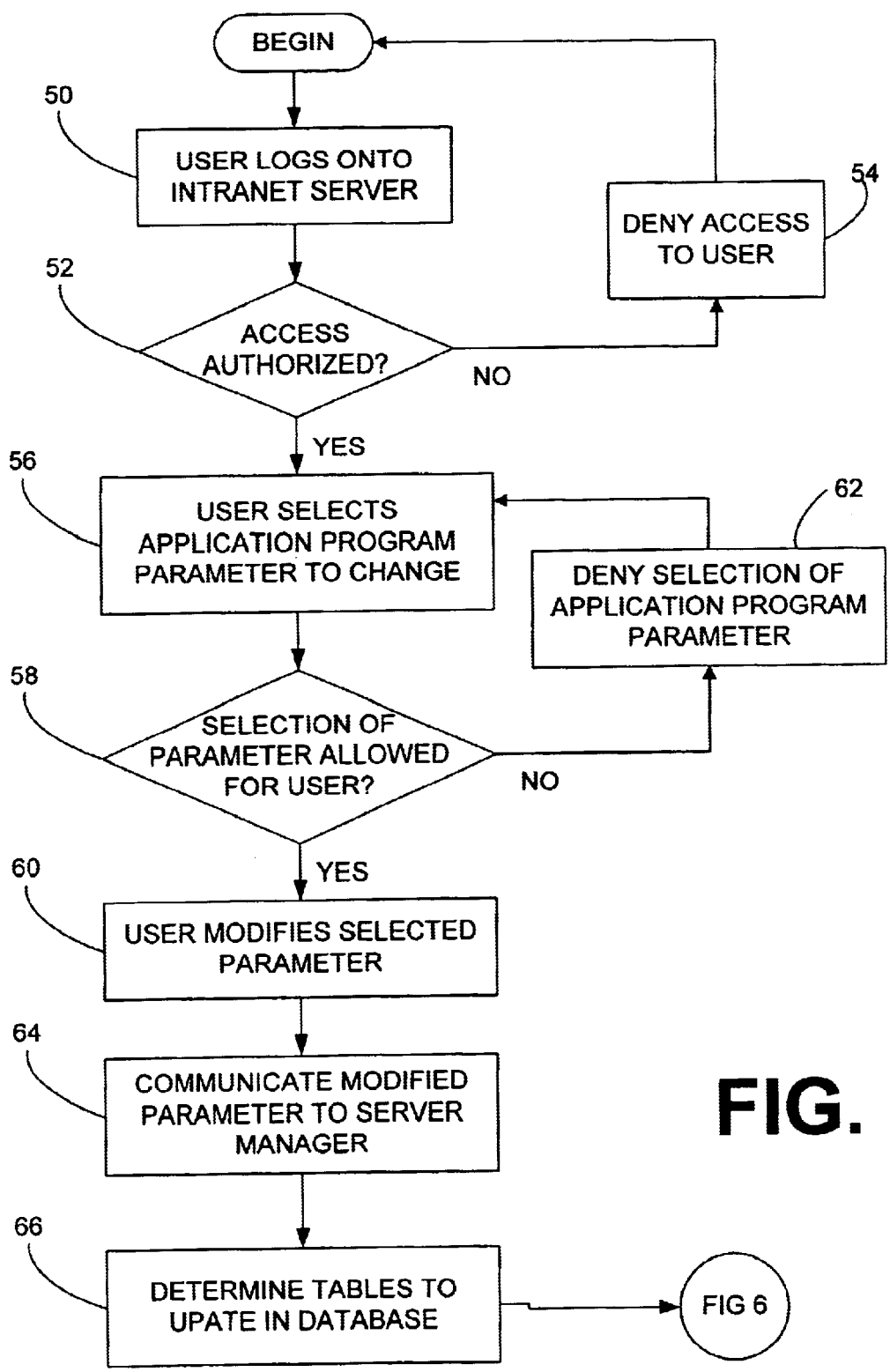
FIG. 5 is a flow chart of one method of user updating of a configuration database.
Figure 6:
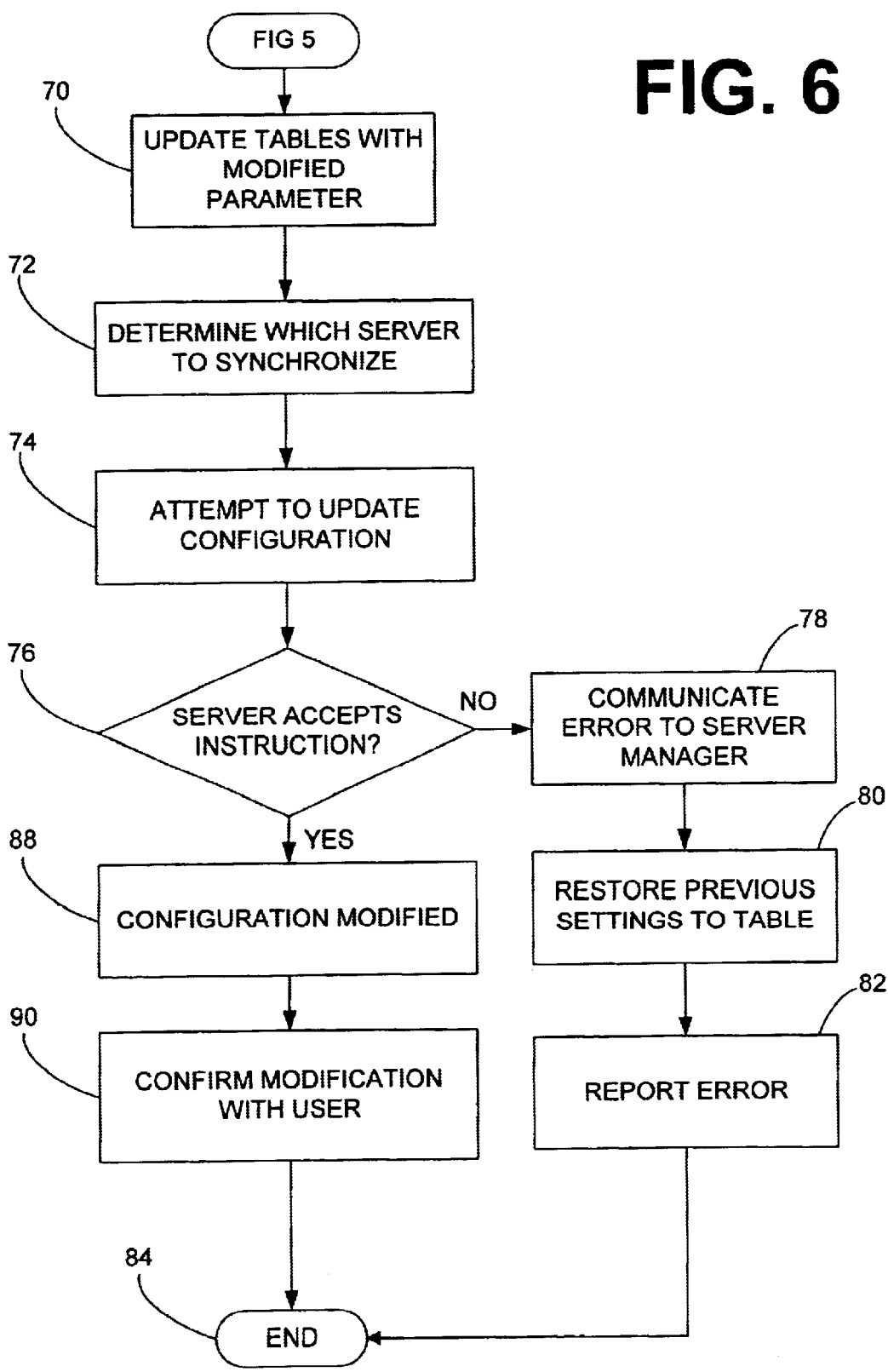
FIG. 6 is a flow chart of one method of user updating of a configuration database.

FIGS. 5 and 6 are flowcharts illustrating a specific embodiment of a method of modification of a server configuration in response to a user request. Process flow begins in block 48. In block 50, a user logs on to the web hosting Intranet server. In block 52, user access to the Intranet server is authenticated. User authorization may be determined through a set of criteria, or "business rules." For example, user access may be denied if the user does not have a valid account, or if the user is not current in their account balance.

If user access is not authorized, flow continues to block 54. In block 54, user access to the web hosting Intranet is denied and flow loops back to block 50. Returning to block 54, if user access is authorized, flow continues to block 56. In block 56, the user selects an application program parameter to change. For example, the user may select a web server configuration application program and request the amount of memory allocated to the user website be modified, such as, for example, to increase the memory allocated from 5 megabytes to 10 megabytes. In another example, the user may select an email application program. For example, the user may add new email accounts or delete existing ones. After the user has selected the application program parameter desired to be changed, flow continues to block 58.

In block 58, the application program parameter selected by the user is checked to determine if it is a parameter the user is allowed to modify. If the user has selected a parameter it is not allowed to modify, such as, for example, attempting to modify a service the user has not contracted for, flow continues to block 60. In block 60, the user is notified that the desired selection has been denied. Flow then continues to block 58. If the user has selected a parameter that is allowed to be modified, flow continues to block 62. In block 62, the user modifies the selected parameter as desired. In some embodiments, these process steps are accomplished by routing a control panel to the user which only allows the user access to those parameters the user is allowed to change. Referring back to FIG. 3, for example, a web-site modification control panel is illustrated which allows the user to modify some aspects of host service but not others. As described above, a space field allows the user to modify the space allocated to the site. However, the host server that the site is resident on and the associated IP address of the site are shown on the control panel, but are not user modifiable. In block 64, the modified parameter is communicated to the server manager. Flow then continues to block 66. In block 66, the server manager evaluates the modified parameter and determines which table or tables are required to be updated in the server manager database. Flow then continues to block 70 in FIG. 6.

In block 70, the server manager updates the tables in the database with the modified parameters. In block 72, the server manager determines which server to synchronize with the updated database reflecting the user request. The server manager may determine a single server configuration is to be updated, or that a plurality of server configurations are to be updated, in response to the user request. Flow then continues to block 74.

In block 74, the server manager instructs the desired server, or plurality of servers, to update their configuration settings. Typically, updating of server configuration settings is performed by a server resident program, such as, for example, a daemon program as described above. Flow then continues to block 76.

In block 76, the server being reconfigured determines if it can accept the instructions and reconfigure itself in the desired manner. For example, if a request of additional memory for a web site is received by a server, the server will determine if there is sufficient memory available to perform the desired reconfiguration. If the server is unable to accept and perform the instructions, flow continues to block 78.

In block 78, the server communicates its inability to accept and perform the requested instructions by notifying the server manager of an error. Flow then continues to block 80. In block 80, the server manager upon receiving the error message restores the previous settings of parameters in the database tables. By restoring the previous settings of parameters in the tables, the server manager database remains synchronized with the server configuration. Flow then continues to block 82. In block 82, an error is reported to the user notifying the user that the requested modification was not performed. Flow then continues to block 84 where flow ends.

Returning to block 76, if the server accepts the instruction and can perform the reconfiguration, flow continues to block 88. In block 88, the server modifies the server configuration in accordance with the updated configuration settings. Flow then continues to block 90. In block 90, the server confirms to the user that the requested modification has been performed. Because the server has been successfully reconfigured, the server manager database is synchronized with the server configuration. It is possible, if the server being reconfigured is down, for example, that no error message or confirmation message is received by the server manager. In this case, the database modification will be reversed, and an error reported, as described above when an explicit error message is received. Flow then continues to block 84 where the process ends.

Figure 7:
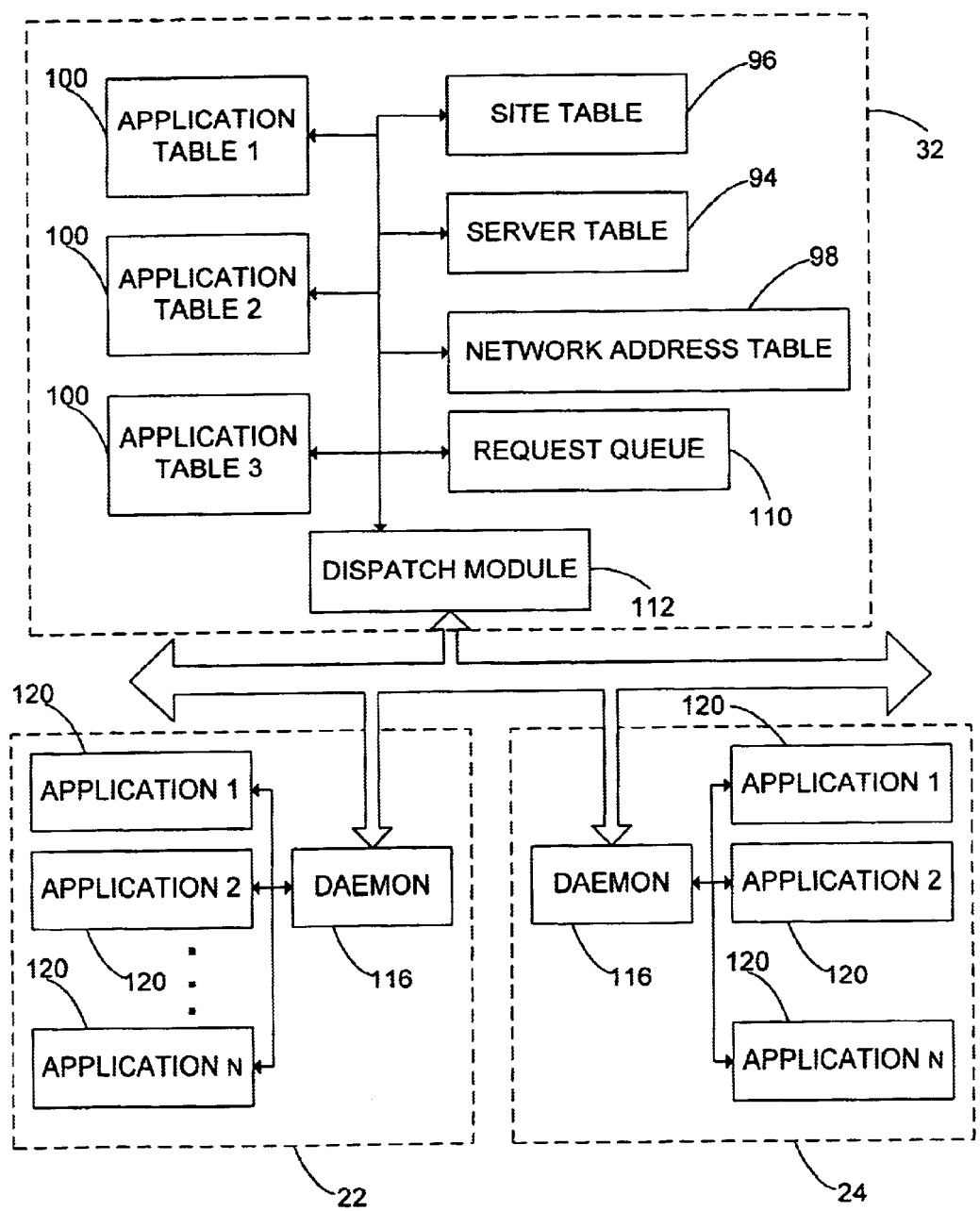
FIG. 7 is a block diagram of a server manager system in accordance with one embodiment of the invention.

FIG. 7 is a block diagram illustrating software modules that reside on the server manager 32 and the servers 22, 24, 26 that the server manager 32 communicates with. As described briefly above, the server manager 32 comprises a database that may advantageously be configured as a plurality of tables containing information about the configuration of the network servers. Although the server configuration information in this specific embodiment is in the form of a plurality of tables, a wide variety of data formats could be used.

As illustrated in FIG. 7, a server table 94 may be provided that contains information about the servers the server manager 32 is designated to communicate configuration parameters to. One embodiment of a server table is illustrated in FIG. 9. Another table 96 includes information about the network resources such as web-sites, email accounts, and the like that are present on the servers. This table may include information about location and properties of all network resources present on the servers. An embodiment of this site table is illustrated in FIG. 10. A network address table 98 contains information about each set of network addresses assigned to respective servers. This table is discussed in additional detail below.

Also advantageously provided are one or more application program tables 100. These tables contain information about the configuration of a selected application program that is running on one or more of the servers 22, 24, 26. For example, a web server table includes information on all web site resources such as server location, capacity, and the like that operate under the control of the web server application program. Similarly, a media server table includes information (such as, for example, maximum allowable number of simultaneously delivered streams) on all network resources that include media delivery capability and that use the media server application program to deliver media content to browsers.

A request queue 110 may be provided that stores requests to add to or modify the information present in the database tables. A FIFO queue may advantageously be utilized, and if desired, the request queue 110 can be configured to suspend modification requests under certain circumstances. For example, requests from a particular user may be suspended because of payment collection issues, for example, or requests which appear to be user errors, such as deleting an entire web site from the servers, can be suspended pending further investigation.

A dispatch module 112 is used to download information to the servers 22, 24, 26 when the tables have been modified or new information is added. The dispatch module triggers a daemon 116 that is resident on each server 22, 24, 26. As described above, the daemon is configured to receive the modified or new parameters from the server manager 32, and to reconfigure the application programs 120 such as web server, media server, etc.

Figure 8:
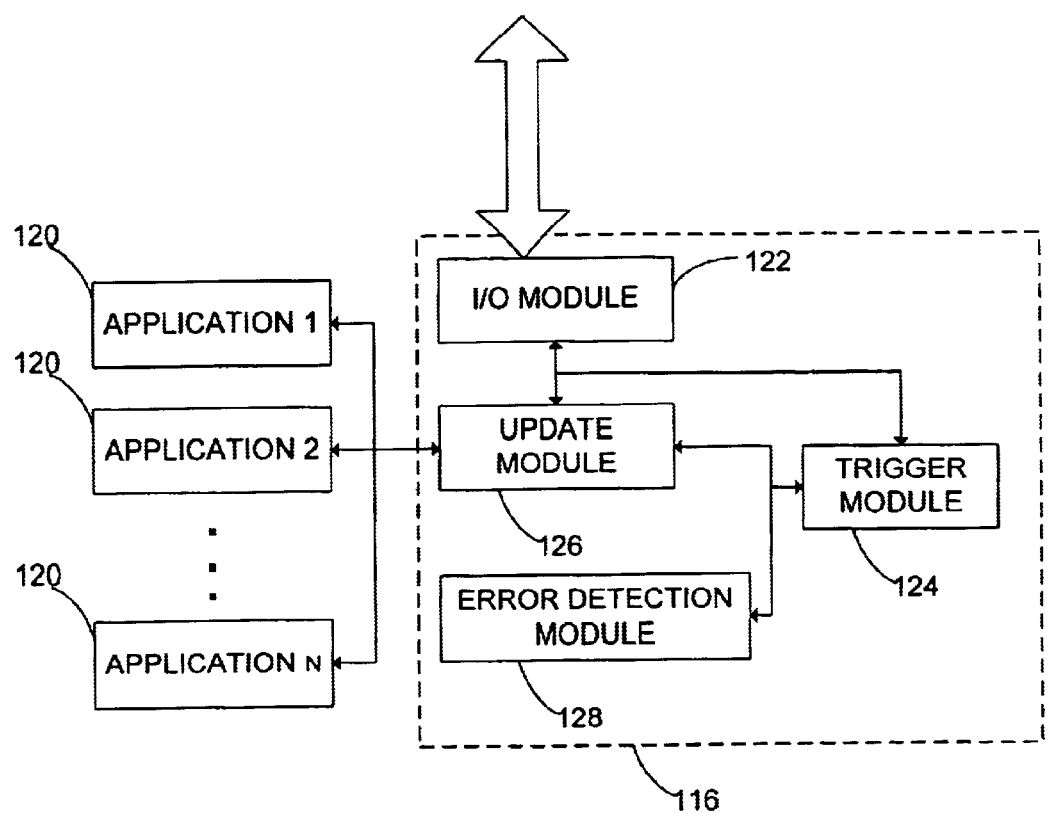
FIG. 8 is a block diagram of the server daemon of FIG. 5.

FIG. 8 illustrates one daemon 116 embodiment in additional detail. In this embodiment, the daemon 116 includes an I/O module 122 for communicating with the server manager 32. Also present is a trigger module 124 which receives a message from the server manager 32 that the server configuration needs to be updated in order to maintain synchronization with the database. Upon receiving this message, the trigger module 124 initiates the operation of an update module 126 and an error detection module 128. The update module receives the configuration data from the server manager 32, and modifies the application programs 120 accordingly. If the application programs accept the re-configuration, the error detection module sends a message to the server manager that the re-configuration has been successful. As described above, if no such message is received by the server manager 32, the database 34 is returned to its original state.

Returning now to the data stored in the database 34, FIGS. 9–12 illustrate specific embodiments of several of the data tables in the embodiment of FIG. 7 described above. It will be appreciated that these embodiments are only specific examples, and that more or fewer table fields could be provided depending on the information required to properly configure the application programs being used and the tracking information that the web hosting service provider would find useful in facility and customer management.

In FIG. 9, one embodiment of a server table 94 is illustrated. In this embodiment, only two fields are provided, an ID field 132 and a description field 134. The ID field comprises a unique name for the machine, and the description field may include a wide variety of information such as operating system, serial number, physical location of the machine, and the like. Of course, the description field 134 could be separated into several fields dedicated to specific server information.

In FIG. 10, one embodiment of a site table 96 is illustrated. This table comprises a comprehensive list of all of the network resources such as web sites that are on the servers controlled by the server manager 32. This table may include a field 140 for a unique site identification number (generally assigned by the web hosting service provider), a field 142 identifying the physical machine/server the site is resident on, a field 144 for storing the user password to access site information and modification tools, and a field 146 for the domain name if applicable.

FIGS. 11 and 12 illustrate application program tables. In FIG. 11, one embodiment of a table for media servers is illustrated. This table may include a field 150 for a site ID for each site having media delivery capacity. The table may also include a server ID field 152, identifying the server the site is located on, the field 154 for the space allocated for the site, and a field 156 for the maximum number of simultaneously deliverable media streams. In FIG. 12, a web server table is illustrated. This table advantageously also includes a field 160 for the site ID, a field 162 for the host server, and a field 164 for allocated space. The table may also include a field 166 for the site IP address. Additional fields 168, 170 for RAM memory and CPU allocation to the web site may be provided in this table.

During the table update process, the server manager 32 may derive or create and then enter the derived information into certain fields without a user specifying the field data. For example, if a user modifies the space allocated to their web site from 10 to 500 MB, the site may need to be moved to another physical server. If this is needed, the server manager 32 may be programmed to select a new server without further user input based on loading or available space considerations. The server selection is then entered into the appropriate table fields.

IP address designation is another example of a configuration parameter that may be performed automatically by the server manager 32. For example, if a new network resource such as a web site is being added by a new or existing customer, or if an existing site is being moved to a new physical server, an IP address must be assigned to the site being created or moved. An IP address is selected by searching the network address table 98 (FIG. 7) for an unused IP address assigned to the server that the network resource is to be resident on.

Figure 13:
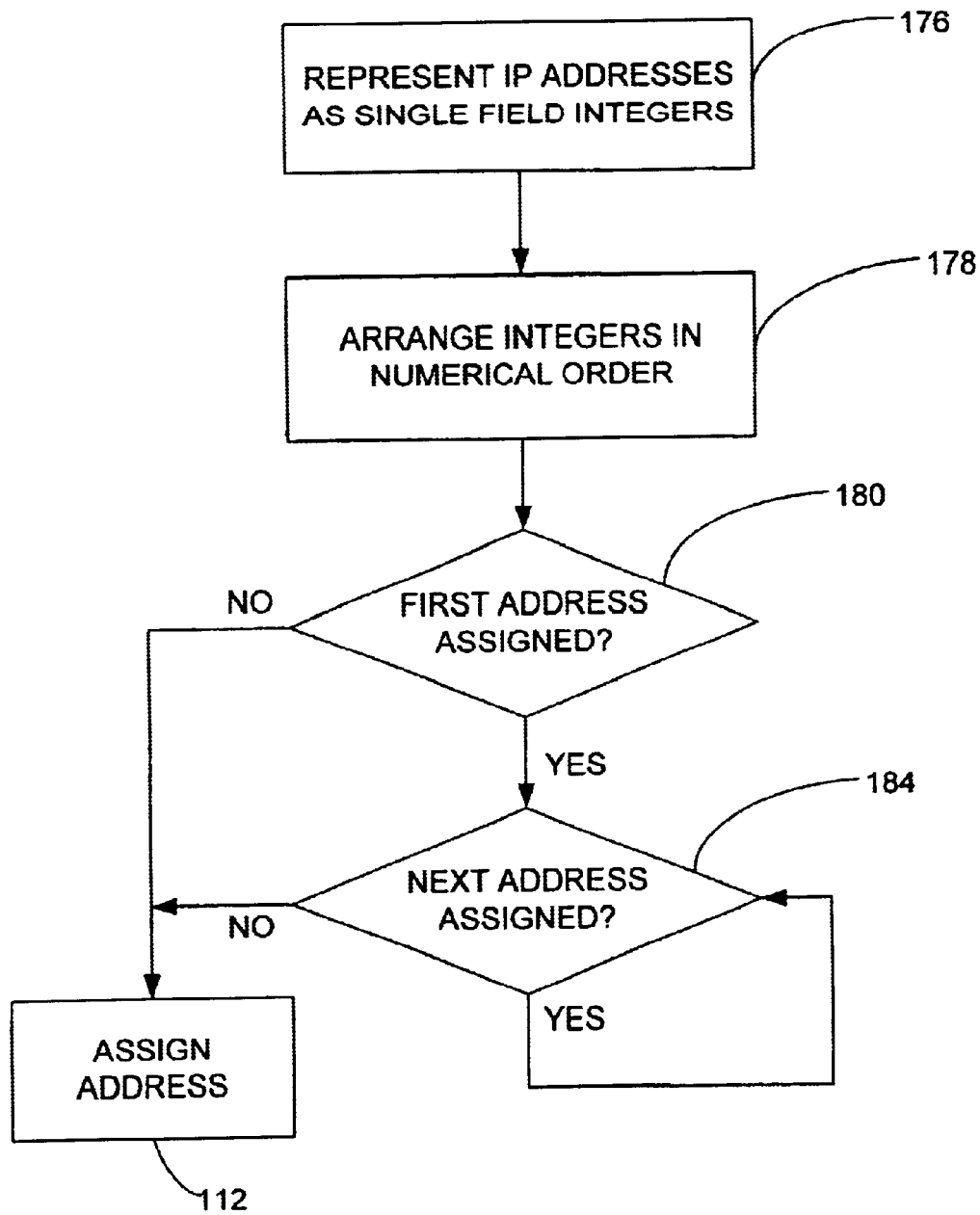
FIG. 13 is a flow chart of a method of assigning network addresses to network resources.

One advantageous embodiment of this process is illustrated in FIG. 13. As shown in this Figure, to facilitate the search for unused IP addresses, at block 176 the normal four field IP address such as the IP address 123.45.255.1, is stored in a single field representation such as 123452551, therefore becoming simply a stored integer. The network address table 98 thus comprises blocks of integers associated with corresponding servers. At block 178, the integers in each block in the table are arranged in ascending or descending numerical order. Integers in the table corresponding to currently used IP addresses are tagged.

When a new IP address needs to be allocated to a network resource, the network address table is searched for an unused IP address. This search is performed quickly using the single field representation because the search algorithm simply starts at the lowest IP address assigned to the relevant server and searches numerically upward until an available address is found. In this embodiment, therefore, the system determines at decision block 180 of FIG. 13 whether or not a first numerically represented IP address is already assigned to a network resource. If it is not, the process moves to block 182 and assigns this address to the new resource. If the first address is assigned, the next numerical IP address is checked at decision block 184. If this address is assigned, the system continues checking the next numerical IP address. Once an unused IP address is identified, the system moves to block 182 and assigns the unused address.

When the next address is to be assigned, the system again starts at the first numerical address at block 180, and again increments numerically until the first available address is identified. This procedure results in fast search times, and guarantees that IP addresses are used efficiently without wasting unused addresses in the middle of the block assigned to a given server that may have become available due to the deletion of a previously supported web site or other network resource.

Thus, utilizing the above described principles, the entire process of modifying server configuration and maintaining synchronization with a database that has the current server configuration stored therein may be performed automatically and without any intervention on the part of a network administrator at the web hosting service provider facility. Control over server configuration is maintained, an accurate centralized database of information for use by the administrator for allocating resources, user billing, and other management functions is provided.

Another advantageous aspect of the system of FIG. 1 is the server inventory database 29. As mentioned above with reference to FIG. 1, this database 29 stores information about the hardware and software configuration and the activity of at least some of the hosting servers 22, 24, 26. Referring now to FIG. 14, users of web hosting services are advantageously provided with at least some of the information in the database 29.

Users may access the database 29 in manner analogous to that described above with reference to the server manager database 34. Access to the intranet server 28 is made with a username and password, for example, and the user is allowed to link to an interactive screen display/control panel that provides portions of the database 29 information to the logged in user or service provider employee/manager. Advantageously, different people, identified by their login information, may be provided access to different portions of the database 29. Typically, system users will be allowed access to some information about the server or servers involved in hosting their contracted services. How much information they receive may be determined by the class of service they are contracting for. Generally, users that have dedicated servers will be allowed access to more server information about their machine(s) than users that share a server with other users. Some service provider employees and managers may be allowed access to the full range of stored information regarding all of the servers operated by the service provider.

One example control panel 188 is illustrated in FIG. 14. In this embodiment, the control panel includes a field 190 where a server ID number may be entered or displayed. In a control panel displayed to a user, this field may be deleted or unchangeable. In this case, based on the login information, the appropriate server information may be automatically retrieved and displayed. Alternatively, this field may be accessible for modification by service provider employees so that they can retrieve information about any of the hosting servers. Service provider employees or managers may also be provided with a search link 191, that links to a search utility for searching for and displaying, for example, all servers in a given facility, all servers running Windows NT, etc.

As is also illustrated in FIG. 14, information about the selected server is displayed in the control panel 188. This information may include a wide variety of information about the hardware configuration of the server, including model 192, serial number 194, speed 196, and amount of memory 198. Additional information such as processor type, hard drive information, or any other characteristic of the nature of the server hardware may also be displayed.

It is also advantageous to provide information about the physical location of the server. This may include an indication 200 of which service provider facility the server is located at. It may also include an indication 202 of where the server is located within that particular facility. Generally speaking, the location information, especially the location within a particular facility, is not provided to system users, although some customers with dedicated servers may be interested in knowing at least the facility information.

Furthermore, information about the software loaded on the server may be provided. This may include a description 204 of the operating system, and a description 206 of any application programs. Additional information about server operation may also be provided, such as server traffic information. In fact, any tracked operational information or statistic of interest to users or service provider employees may be displayed on this control panel 188.

In contrast with the server manager control panel illustrated in FIG. 3, the fields of the control panel 188 which display this server information are generally not modifiable as they involve characteristics that typically require human intervention to alter. Thus, if a user wishes to modify any of these server characteristics, a link 210 may be provided for this purpose. The link 210 may connect the user to a service provider contact page that allows the user to request a server modification such as application program upgrade, memory increase, etc. Following this, the relevant server may be manually modified according to the user request.

The server inventory database thus provides both users and service provider employees with convenient access to server information, as well as a convenient method to request server alterations. In system embodiments which include both the server manager utility and the server inventory tracking utility, an especially dramatic reduction in labor and cost over conventional server configuration management techniques can be obtained.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A web hosting system comprising:
   a plurality of geographically separate web hosting facilities associated with a web hosting provider;
   a plurality of servers located at each of said facilities having internet resources hosted thereon; and
   a server inventory database remote from at least some of said geographically separate web hosting facilities, said database configured to allow access to a first portion of the database by first user and access to a second distinct portion by a second user.

2. The web hosting system of claim 1, additionally comprising a database access program.

3. The system of claim 1, wherein said server inventory database contains information comprising one or more of server serial number, server model, server facility location, server location within a facility, server speed, server memory capacity, server traffic, and server software configuration for at least some of said plurality of servers.

4. The system of claim 3, wherein said server software configuration information comprises information regarding server operating system and server application programs.

5. The system of claim 1, wherein said portion is identified by login information.

6. The system of claim 1, wherein said first user is a customer of the web hosting provider.

7. The system of claim 6, wherein said first portion corresponds to information related to a first one of said servers, wherein said first one of said servers is a server providing hosting services to said customer.

8. The system of claim 7, wherein said information is determined by a class of service provided to said customer.

9. The system of claim 8, wherein said class of service comprises a dedicated server.

10. The system of claim 8, wherein said class of service comprises a shared server.

11. A computer implemented method of managing the configuration of a plurality of geographically separated servers, said method comprising:
    storing, in a database, information related to the inventory of said servers, wherein each of said servers is used to host internet resources, said database configured to allow access to a first portion of the database by first user and access to a second distinct portion by a second user;
    routing a predefined subset of said information to a user in a server information web page;
    in response to said routing, receiving from a user a request for a configuration change of at least one of said servers; and
    in response to said request, modifying said server configuration.

12. The method of claim 11, wherein said server information web page includes information related to configuration of an application program.

13. The method of claim 12, wherein said entering a request comprises entering said request onto said server information web page, and wherein said modification is performed automatically without human intervention.

14. The method of claim 11, wherein said server information web page includes information related to server hardware configuration.

15. The method of claim 14, additionally comprising linking, prior to entering said request, to a service provider contact web page, and wherein said modification is performed manually.

16. The system of claim 11, wherein said first user is a customer of a web hosting provider associated with at least one of said servers.

17. The system of claim 16, wherein said first portion corresponds to information related to a first one of said servers, wherein said first one of said servers is a server providing hosting services to said customer.

18. An information processing system comprising:
    a plurality of servers hosting internet resources;
    a first database storing server hardware inventory information regarding said plurality of servers, said first database configured to allow access to a first portion of the database by first user and access to a second distinct portion by a second user; and
    a second database storing parameter information for application programs, said application programs running on said plurality of servers.

19. The information processing system of claim 18, wherein said first database and said second database are remote from at least some of said plurality of servers.

20. The system of claim 18, wherein said first user is a customer of a web hosting provider associated with at least one of said servers.

21. The system of claim 20, wherein said first portion corresponds to information related to a first one of said servers, wherein said first one of said servers is a server providing hosting services to said customer.

22. A method of managing web hosting resources comprising:
    storing server hardware inventory information regarding a plurality of servers in a first centralized database, said first centralized database configured to allow access to a first portion of the database by first user and access to a second distinct portion by a second user;
    storing, in a second centralized database, parameter information for application programs, said application programs running on said plurality of servers;
    routing information from both of said databases to users of said web hosting resource;
    receiving requests to modify one or both of server hardware or application program parameters from said users; and
    modifying one or both of said server hardware or application program parameters in response to said requests.

23. The method of claim 22, wherein said databases are separate.

24. The method of claim 22, comprising updating said database, and in response thereto, automatically modifying said parameter information.

25. The system of claim 22, wherein said first user is a customer of a web hosting provider associated with at least one of said servers.

26. The system of claim 25, wherein said first portion corresponds to information related to a first one of said servers, wherein said first one of said servers is a server providing hosting services to said customer.

* * * * *

UNITED STATES PATENT AND TRADEMARK OFFICE
CERTIFICATE OF CORRECTION

| | | |
|---|---|---|
| PATENT NO. | : 6,868,444 B1 | Page 1 of 1 |
| APPLICATION NO. | : 09/678170 | |
| DATED | : March 15, 2005 | |
| INVENTOR(S) | : Steven D. Kim and Lior Elazary | |

It is certified that error appears in the above-identified patent and that said Letters Patent is hereby corrected as shown below:

The following figure is added:

SERVER INVENTORY

Server I.D. Number: SGI1008 /190
Model: SGI 12000 /192
Serial: 128743AA346 /194
Speed: 450 MHz /196
Memory: 512 M /198
Facility: Denver1 /200
Location: Rack 20 /202
OS: Linux /204
Software: Web Server V.4.5 /206
Mail Server V.2

210 — REQUEST MODIFICATION    SEARCH    /191

FIG. 14

Signed and Sealed this

Twelfth Day of June, 2007

JON W. DUDAS
*Director of the United States Patent and Trademark Office*